June 16, 1953         A. F. SPERLING ET AL         2,641,974
APPARATUS FOR CUTTING AND STACKING SHEETS
Filed Aug. 5, 1949                                    2 Sheets-Sheet 2
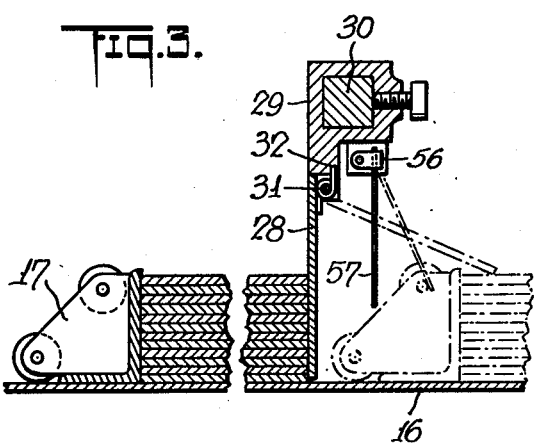
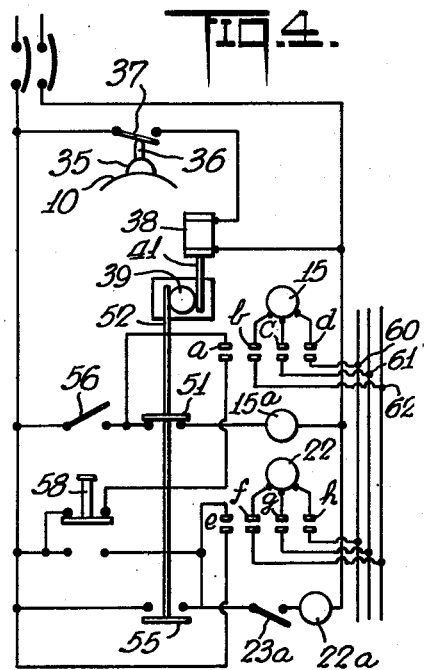
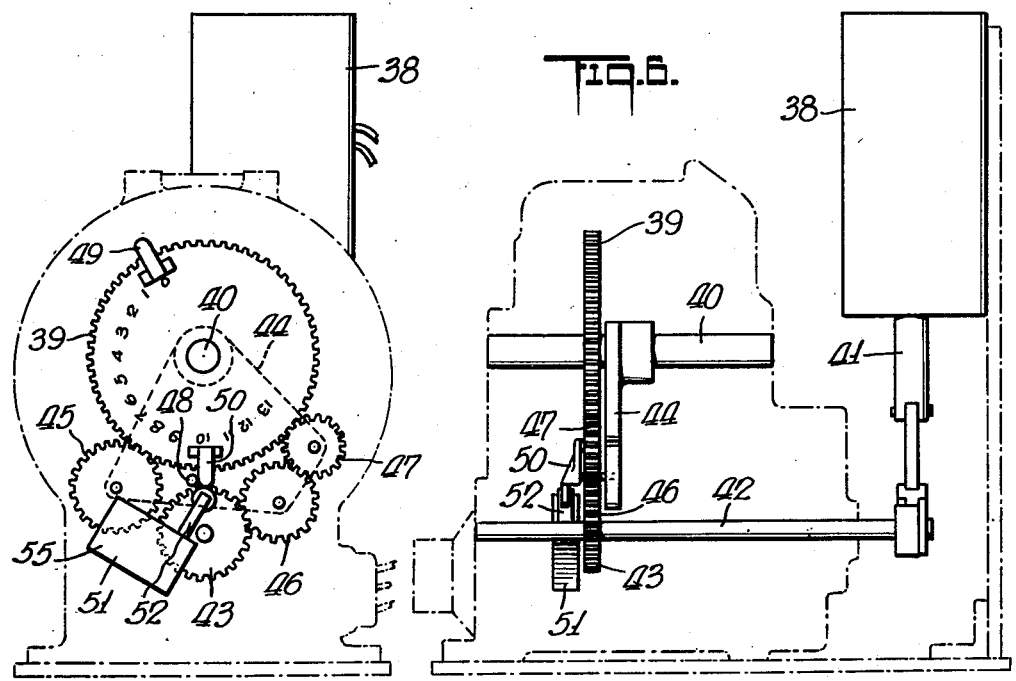
INVENTOR
Arthur F. Sperling
William E. Schroeder
BY
Dean Fairbank & Hirsch
ATTORNEYS

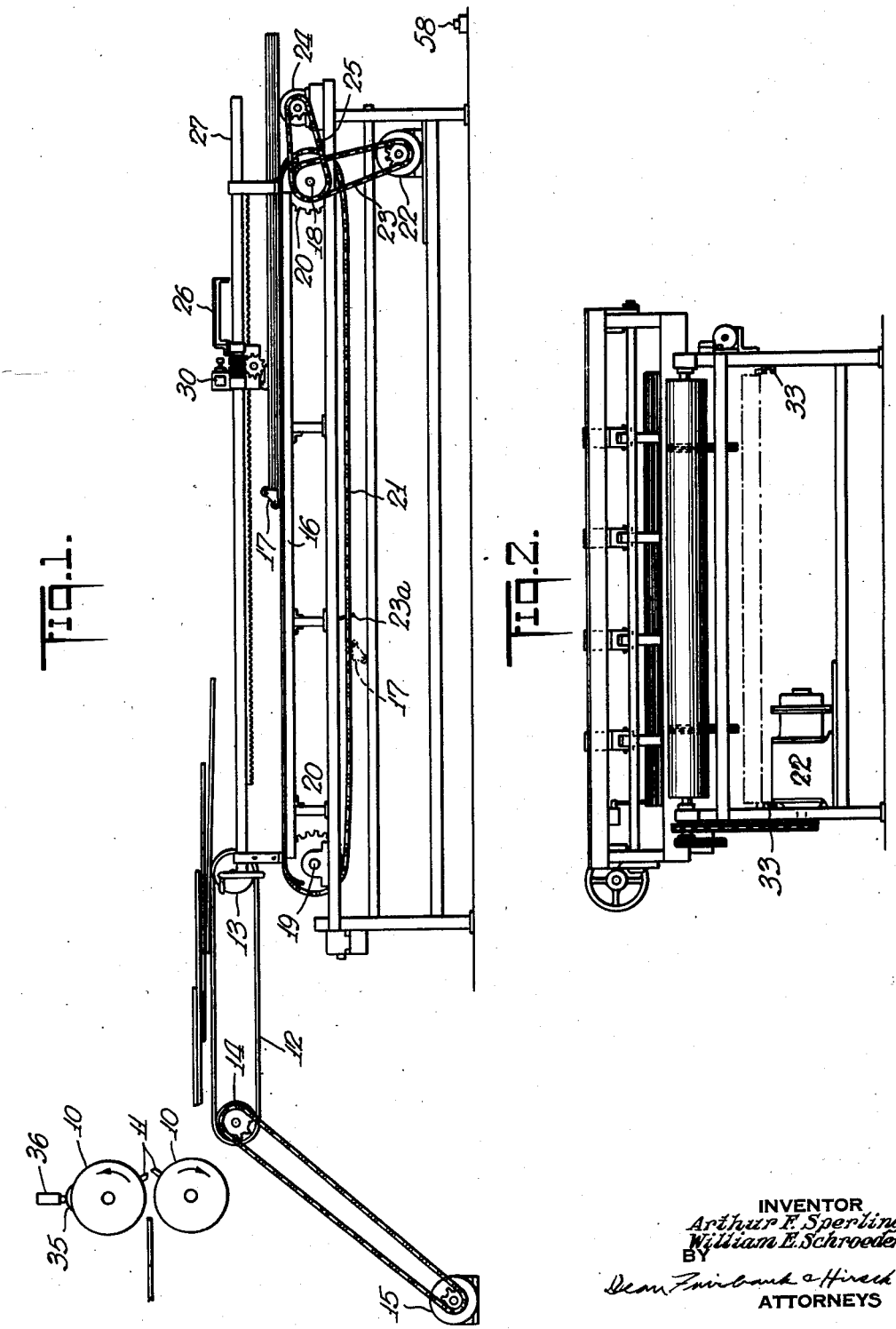

UNITED STATES PATENT OFFICE 2,641,974

APPARATUS FOR CUTTING AND STACKING SHEETS

Arthur F. Sperling, Milwaukee, Wis., and William E. Schroeder, Westmont, N. J., assignors to Samuel M. Langston Co., Camden, N. J., a corporation of New Jersey Application August 5, 1949, Serial No. 108,844

14 Claims. (Cl. 93—93)

In the manufacture of double faced corrugated board and other types of stiff sheet material, a plurality of wide sheets which may or may not have been slitted lengthwise, are delivered in succession from cut-off mechanism and assembled in superimposed relationship to form stacks.

With constantly increasing operating speeds on corrugating units, the speed at which the sheets are delivered at the cut-off end is becoming correspondingly greater. Modern machines for making double faced corrugated board deliver the sheet material through the cutting mechanism at a speed of 350 to 500 linear feet per minute, and a serious problem is presented in regard to stacking and disposing of the resulting product. This has now reached a point where men can no longer pick up the separate sheets by hand and load them on trucks, as was once common practice.

Various types of sheet handling equipment have been tried, and experience has indicated very definitely that it is desirable to deliver the sheets in small stacks or batches which, depending upon sheet size and operator's preference, contain from 15 to as many as 25 sheets per batch.

The present invention relates to apparatus for receiving and stacking relatively stiff sheets or thin boards, such for instance as double faced corrugated sheet material, as the stiff sheets are delivered from a machine which produces or processes them, cuts them into sections of predetermined length, assembles them in a stack, and removes from the bottom of the stack batches, each of a predetermined height.

More particularly, it involves an improvement in the apparatus disclosed in copending application Serial No. 26,948, filed May 14, 1948, by Nicholas McClure and Samuel D. Stacy. In that apparatus there is provided a table onto which the sheets are delivered at high speed and in succession, and a stop in the path of movement of said sheets so that said sheets accumulate as a stack. The stop is spaced above the table to a distance equal to the height of the desired batch, and a pusher connected to an endless conveyor intermittently moves over the table beneath the sheets being delivered, and moves successive batches from the bottom of the stack, pushes them beneath the stop and discharges them from the table, each batch being of a height determined by the spacing of the stop above the table. As each batch is moved beneath the stop the superposed sheets of the stack drop down onto the table.

Although such an apparatus performs the desired function it requires a great deal of attention on the part of the operator. For instance, if the top sheet of the batch engaged by the pusher be slightly warped, it will engage the stop rather than move beneath it, and the batch will contain fewer than the desired number of sheets. If the sheets are not delivered at such a speed that they will operate the switch to start the pusher, the stack may pile up to an undesirable height, and the switch must be closed by hand to start the pusher and move a batch from the bottom of the stack. If they are not delivered at sufficient velocity they may come to rest before reaching the switch, and it is necessary to manually operate the switch to start the pusher. Care must be exercised to adjust both ends of the stop to the same elevation. The power required to operate the pusher will vary with the height of the stack of sheets from the bottom of which the batch is pushed.

The main objects of the present invention are to overcome various objections, including those above noted, and to provide an apparatus which will operate with greater certainty, with less personal attention, and less power consumption.

As an important feature of our improved apparatus we provide a pivoted stop held in a vertical position by a spring of such strength that it will hold the stop in a vertical position to align the end edges of the sheets, but will permit the stop to swing out of the way when the pusher engages a batch and positively advances it.

As a further feature we provide a sheet counter which operates to start the pusher only when the selected number of sheets have accumulated on the table, so that the timing of operation of the pusher will not be dependent on the operation of a switch actuated by the sheets themselves, but will be positively controlled by the sheet cutter or sheet delivery means.

As a further feature the apparatus is so designed that the sheets may accumulate on the table behind the stop, and the pusher will force the pile up to the stop to properly stack the sheets, and will carry a batch made up of the desired number of sheets beneath the stop as it forces the latter to swing out of the way of the sheets. Thus, while the pusher is operating, sheets may accumulate in the rear of the pusher.

As a further feature, means are provided for temporarily slowing up the sheets before they are delivered onto the table, and while the pusher is moving a batch along the table. After the pusher has advanced the batch, the feed mechanism builds up a pile at the rear end of the table and behind the pusher, and while the latter is advancing the sheets, and thereafter returns beneath the table.

In the accompanying drawings there is illustrated only one of many possible embodiments of the invention. In these drawings:

Fig. 1 is a side elevation showing the batch pusher part way along in the batch removing operation.

Fig. 2 is an end view of the machine as seen from the left of Fig. 1.

Fig. 3 is a section similar to a part of Fig. 1, and on a larger scale, showing in solid lines the position of the pusher and stop at the beginning of the operation of batch removal, and in dot and dash lines the position of the pusher and batch as they leave the stop.

Fig. 4 is a wiring diagram, and

Figs. 5 and 6 show a control unit.

In the machine illustrated the continuously produced stiff web is cut into sections, hereinafter called sheets, by a cut-off mechanism illustrated as a pair of rotary cutters 10 having coacting knives 11 which move into and through the web and travel with and at the same speed as the web during the cutting operation. During the remaining portion of the cycle their speed may be reduced or increased as desired, and in accordance with the predetermined length of the sheets. For this purpose there may be employed any cutter speed varying means well known in the art, as for instance the mechanism disclosed and claimed in the Behrens Patent 2,262,913.

As one feature of the invention the cutters or parts acting in synchronism therewith act to close and open an electric circuit once each time a sheet is cut off or is delivered to the batch forming apparatus. That circuit controls the operation of the batch pusher so that after a predetermined number of sheets have been delivered the pusher is started. As hereinafter pointed out, the frequency of operation of the pusher may be varied so that it comes into operation each time that any predetermined number of sheets have been received.

The sheets as cut off from the web drop onto a conveyor 12 which may be a plurality of narrow endless belts on pulleys 13 and 14, one of which may be driven by the motor 15. As later pointed out, this motor 15 is stopped when the pusher starts so that the sheets accumulate as a stack on the conveyor while at rest during a portion of the travel of the pusher. Due to the slower motion of this conveyor the sheets accumulate thereon in substantially, but not completely overlapped positions, and as each lower sheet moves beyond the pulley 13 it drops onto the table 16 in the rear of the pusher 17, and there the sheets pile up as a somewhat irregular stack.

The table 16 and pusher 17 may be substantially as illustrated in application 26,948 above referred to. As there shown, shafts 18 and 19 are journaled adjacent to opposite ends of the table and therebeneath. On each of these shafts thereare a plurality of sprocket wheels 20 for driving a plurality of endless chains 21. The upper run of each chain lies in a longitudinal slot in the table, and to these chains are secured the pusher 17, which moves in one direction over the table and in the opposite direction therebeneath. The chains may be operated and the pusher advanced intermittently by a motor 22 connected to the shaft 18 at the delivery end of the machine by means of sprockets and a chain 23. At the delivery end of the machine there may be provided a batch supporting roller 24 onto which the batch passes in leaving the machine, and this may be driven through a chain 25 from the shaft 18, and at higher speed than the speed of movement of the pusher, so that the rear end of the batch, when supported by this roller, is speeded up and the pusher may readily pass around the sprocket wheel 20. Mounted above the table is a platform 26 supporting the batch stop and adjustable along side rails 27 in any suitable manner, and to the desired position in accordance with the length of the sheets. To the extent so far described the apparatus may be substantially the same as that disclosed in the McClure and Stacy application above referred to.

In our improved construction there is provided a stop for the sheets, and in the form of a normally vertically disposed plate 28 having its lower edge normally close to the table and its upper edge pivotally connected to one or more brackets 29 adjustable transversely of the machine, and along a transversely extending bar 30 mounted on the platform 26. The stop, instead of being vertically adjustable, is pivotally mounted on a rod, shaft or other support 31 carried by the brackets 29, and there is provided a spring 32 normally holding the stop in its vertical position and permitting but resisting the swinging of the stop from the vertical position shown in Fig. 3 to the position shown in dot and dash lines, so that the batch and pusher may pass therebeneath, and from the position shown in solid lines to and beyond the position shown in dot and dash lines. The spring is sufficiently stiff to temporarily hold back sheets that may be in advance of other sheets to insure the formation of a neat easily handled pile.

The pusher is normally disposed on the lower run of the chains where it has stopped after opening the circuit of the motor 22 by momentarily opening a switch 23a. It may be prevented from sagging in its lower run by being provided with rollers at its end traveling in channels in side rails 33 on the frame. The motor operating the chains and pusher is automatically started when the predetermined number of sheets have accumulated on the rear end of the table.

The pusher 17 moves from the rest position shown in dotted lines in Fig. 1 around the sprockets 20, engages a batch and advances it along the table. As the batch reaches the stop 28 the latter holds back the more advanced sheets, while the pusher moves the other sheet forward against the stop, thereby to form a neat, regular batch, as shown in Fig. 3, and having a predetermined number of sheets. The further forward movement of the pusher and batch swings the stop out of the way, and the batch is delivered onto the roller 24 where it is speeded up while the pusher moves around the sprockets 20 and beneath the table until it reaches and momentarily opens the trip switch 23a and comes to rest.

As an important feature our invention involves the automatic control of the motor 22 each time a predetermined number of sheets have accumulated on the table. The electric circuit may be as shown in Fig. 4.

One of the cutters 10, or some part operatively connected thereto, is provided with a cam 35 which operates a movable member such as a plunger 36 once during each revolution of the cutter. As shown in the wiring diagram, Fig. 4, the plunger operates to momentarily close a switch 37 in a circuit leading to a solenoid coil 38 forming a part of or associated with a sheet counting and circuit controlling unit. This unit employed for closing the circuit of the motor 22 and advancing the pusher when the switch 37 has been closed a predetermined number of times, may be of various different types. In commercial practice there may be employed a device made by Counter & Control Corp., and sold under the trade name "Cyclo-Monitor."

Merely to facilitate an understanding of the operation of an apparatus suitable for this purpose there is a somewhat diagrammatic showing in Figs. 5 and 6. As there shown, it includes an oscillatory disc 39 mounted on a shaft 40 and having gear teeth and a scale from 0 to the maximum number of sheets for a desired batch. The solenoid 38 has a plunger 41 provided with suitable means for imparting step by step rotation to a shaft 42 having a gear 43. Suspended on the shaft 40 is a plate 44 having a pair of spaced gears 45 and 46 on opposed sides of the gear 43. The gear 45 meshes with the gear teeth on the disc 39, and the other gear 46 meshes with a gear 47 which meshes with the gear teeth on the disc 39. The plate has a stop 48 and the disc has a pair of gear shifting members 49 and 50 on opposite sides of the stop 48. One of these members, 49, is fixed at the zero point of the scale and the other, 50, may be secured opposite the number on the scale indicating the desired stack size.

At the starting of operations the parts are in the positions illustrated. Each time a sheet is cut off by the knife 11 the circuit is closed at the switch 37 and the solenoid 38 is operated. This acts through the shaft 42 and gears 43 and 45 to turn the disc one step in one direction, or through gears 43, 46 and 47 to turn the disc 39 one step in the opposite direction. When the desired number of sheets have been cut off the gear shift member 49 engages the stop 48 and oscillates the plate 44 to move the gear 45 into mesh with the gear 43 and move the gear 46 out of mesh. Therefore, on the next sheet cutting operation the disc 39 will turn in the opposite direction, and this continues step by step until the gear shift member 50 engages the stop and shifts the gear 45 out of mesh and the gear 46 into mesh. Mounted on the control unit is a double throw switch for the circuit of the motors 22 and 15.

Referring to the wiring diagram, Fig. 4, it will be seen that the solenoid coil 38 is in the circuit controlled by the switch 37 of the cutter. Thus, each time a sheet is cut off and the circuit is closed by the switch 37, the solenoid coil 38 is energized and the disc 39 turns one step. When the desired number of sheets for a batch have been cut, one of the members 49 or 50 reaches and moves the double throw switch member 52. Thus the switch member 51 opens the circuit of the motor 15, and thereby stops the delivery of the sheets by the belt 12 onto the table, and raises the switch member 55 to close the circuit of motor 22 to start the batch pusher across the table. When the motor 15 stops, the sheets being cut off will accumulate on the conveyor belt 12 without being delivered from the latter onto the table. When the motor 22 starts it causes the pusher to move from the position shown in dotted lines in Fig. 1 around to the rear end of the batch, and in moving over the table it pushes the batch forward along the table. The sheets are first pressed against the stop 28 to form a neat pile, and the batch of predetermined height on being moved from the bottom of the pile pushes the stop out of the way, passes beneath the stop, and is discharged from the table. When the pusher has moved around to the position shown in dotted lines, and beneath the table, it momentarily opens the switch 23a to stop the motor 22, but its momentum carries the pusher a short distance beyond the switch and lets it close again.

In the wiring diagram, Fig. 4, the motors 15 and 22 are shown as driven from three-phase power source lines 60, 61 and 62, and holding coils 15a and 22a are employed in the control circuit for opening and closing the circuits to these motors.

Each time a sheet is cut off from the web by the cutters 10 and 11 the circuit of the solenoid 38 is momentarily closed and opened, and the gear 39 is rotated one notch. When the desired number of sheets for a batch have been cut, one of the members 49 or 50 operates the limit switch 52 momentarily opens switch 51, and closes switch 55. The opening of the switch de-energizes the coil 15a and this opens the contacts $a$, $b$, $c$, and $d$. This stops the motor 15 and the delivery of sheets to the table 16.

The momentary closing of switch 55 causes current to flow through normally closed switch 23a and the holding coil 22a, and this closes contacts $e$, $f$, $g$ and $h$. Closing of the contact $e$ insures continued flow of current to the holding coil 22a after switch 55 has reopened. Contacts $f$, $g$ and $h$ are in the supply lines to the three-phase motor 22. When they close motor 22 starts and drives the pusher 17. The pusher 17 clears the table of accumulated sheets, and as pusher 17 passes under the stop 28 the pusher operates switch lever 57 (Fig. 3) that closes switch 56 momentarily. This closes contacts $a$, $b$, $c$ and $d$ and starts motor 15, and sheets are again delivered to table 16. Contact $a$ insures a flow of current to the holding coil 15a after switch 56 reopens. After passing switch lever 57 the pusher continues to travel until it reaches a position below the table and momentarily opens the switch 23a which breaks the circuit to the holding coil 22a and stops the motor 22 until the desired number of sheets for a batch have been cut and one of the members 49 or 50 again momentarily opens switch 51 and closes the switch 55.

In order that the operator may at will stop the operation of the sheet feeder 12 and clear the table of accumulated sheets, even though not of the number desired for a batch, there is provided a switch 58, preferably disposed at the delivery end of the machine, and preferably operated by pressing a foot thereon. This switch normally closes the circuit to the contact $a$ of the holding coil 15a, but when depressed it opens the circuit and closes the circuit of the holding coil 22a of the motor 22. Thus the pusher will operate and clear the table, and while switch 58 is depressed the motor 15 is prevented from further delivery of sheets to the table by the belts 12.

Thus it will be seen that the delivered sheet material is cut into sections, the sections stacked into batches of predetermined size, the batches delivered from the table, and the entire operation accurately controlled in a simple and efficient manner.

Having thus described our invention what we claim as new and desire to secure by Letters Patent is:

1. A machine for forming batches of stiff sheets, each batch being of predetermined height, including a table having a sheet stop pivotally supported at its upper edge whereby the lower edge may move lengthwise of the table and in the same general direction as the sheets, a conveyor for delivering sheets onto said table, a pusher for moving batches of sheets along said table and against and beneath said pivoted sheet stop, means for starting said conveyor when a batch of sheets has been moved past said stop by said pusher, and means for automatically stopping said conveyor when a predetermined number of sheets have been delivered thereto.

2. A machine for forming batches of stiff sheets, each batch being of predetermined height, including a table, a sheet cutter, a sheet counter, a conveyor for delivering said sheets onto said table, a pivoted stop in the path of said sheets on said table, means controlled by said counter for starting said conveyor, and means controlled by said stop for stopping said conveyor.

3. A machine for forming batches of stiff sheets, each batch being of predetermined height, including a table, a sheet cutter, a sheet counter operated by said cutter, a conveyor for delivering said sheets onto said table, a pivoted stop in the path of said sheets on said table, means controlled by said counter for starting said conveyor, means controlled by said stop for preventing operation of said conveyor while a batch is passing beneath said stop, and means for starting said conveyor when the batch passes said stop.

4. A machine for forming batches of stiff sheets, each batch being of predetermined height, including a cutter for subdividing a moving web into sheets, a conveyor onto which said sheets are delivered, a table onto which said conveyor delivers said sheets, a counter for controlling the operation of said conveyor, a stop pivotally supported at its upper edge in the path of movement of said sheets, a pusher for moving an accumulated batch of sheets against said stop and thereby swinging the latter out of the path of movement of said batch, means for starting said conveyor when a predetermined number of sheets have been cut, means for simultaneously stopping said conveyor and starting said pusher, and means for starting said conveyor when a batch of sheets has passed said stop.

5. An apparatus for receiving and stacking successively delivered stiff sheets and delivering batches of such sheets, each batch comprising a predetermined number of sheets, said machine including a table onto one end of which the sheets are delivered, a stop in the path of movement of said sheets on the table, a sheet counter, a sheet pusher movable over said table to deliver successive batches of sheets from the table, means controlled by said sheet counter for actuating said pusher to advance successive batches and thereby move said stop out of the path of the batch, and means controlled by said stop for starting the delivery of sheets onto said table when a batch of sheets has passed said stop.

6. A machine for forming and delivering batches of stiff sheets, said machine having a sheet cutter, a conveyor receiving sheets from said cutter, a table receiving sheets from said conveyor, and a pusher movable over said table for delivering batches of sheets from said table, said machine being characterized by a stop having its upper edge pivotally mounted above said table and its lower edge normally disposed in the path of movement of the sheets, a spring for permitting but resisting swinging movement of said stop, means for stopping said conveyor when a predetermined number of sheets have been cut, and means for starting said conveyor when said pusher has advanced a batch of sheets beyond said stop.

7. A machine for forming batches of stiff sheets, including a sheet cutter, a conveyor for delivering said sheets from said cutter, a table onto which said sheets are delivered by said conveyor to form a stack, a pusher for advancing batches of sheets along said table and delivering them therefrom, a stop in the path of movement of the sheets on said table, and pivoted to swing out of the path of movement of said sheets, and control means for said conveyor including means for automatically stopping it each time a predetermined number of sheets have been cut and automatically starting it when a batch of sheets have been delivered beneath and past said stop.

8. A machine for forming and delivering batches of stiff sheet material, including a cutter, a conveyor onto which sheets are delivered from said cutter, a table onto which the sheets are delivered by said conveyor, a pusher for advancing batches of sheets along said table and delivering them therefrom, an electric motor for operating said conveyor, an electric motor for operating said pusher, means for stopping the first mentioned motor when a predetermined number of sheets have been cut and simultaneously starting said second mentioned motor to advance a batch of sheets over said table, means for starting said first mentioned motor when a batch of sheets has reached a predetermined position along said table, and means for stopping said second mentioned motor after a batch has been delivered from said table.

9. A machine as defined in claim 8, in which there is provided a sheet counter for effecting the stopping of the first mentioned motor and the starting of the second each time a predetermined number of sheets have been delivered to said conveyor.

10. A machine for forming and delivering batches of stiff sheet material, including a cutter, a conveyor onto which sheets are delivered from said cutter, a table onto which the sheets are delivered by said conveyor, a pusher for advancing batches of sheets along said table and delivering them therefrom, an electric motor for operating said conveyor, an electric motor for operating said pusher, and a sheet counter having means for simultaneously stopping said first mentioned motor and starting said second mentioned motor.

11. A machine for forming and delivering batches of stiff sheet material, including a cutter, a conveyor onto which sheets are delivered from said cutter, a table onto which the sheets are delivered by said conveyor, a pusher for advancing batches of sheets along said table and delivering them therefrom, an electric motor for operating said conveyor, an electric motor for operating said pusher, a sheet counter having means for simultaneously stopping said first mentioned motor and starting said second mentioned motor, means for starting said first mentioned motor when a batch of sheets has reached a predetermined position along said table, and means for stopping said second mentioned motor after a batch has been delivered from said table.

12. A machine for assembling sheets in batches each of a predetermined height, and delivering said batches, said machine including a sheet conveyor, a table onto which said sheets are delivered by said conveyor, a pivotally supported stop above said table and in the path of movement of said sheets over said table, a batch pusher movable in one direction over the table to push said stop, and in the opposite direction beneath said table, means for automatically and intermittently stopping said conveyor and moving said pusher over said table to advance a batch of sheets along said table and against and beneath said stop thereby to swing said stop out of the path of movement of said batch, and means for automatically and intermittently starting said conveyor when a batch has been moved past said stop and the latter has swung down to sheet stopping position.

13. A machine for assembling sheets in batches each of a predetermined height, and delivering said batches, said machine including a sheet conveyor, means for cutting a continuously advancing web into sheets deposited on said conveyor, a table onto which said sheets are delivered by said conveyor, a pivotally supported stop above said table and in the path of movement of said sheets over said table, a batch pusher movable in one direction over the table and beneath said stop, and in the opposite direction beneath said table, means for intermittently and automatically stopping said conveyor and moving said pusher over said table to advance a batch of sheets along said table and against and beneath said stop thereby to swing said stop out of the path of movement of said batch, and means for automatically starting said conveyor when a batch has been moved past said stop and the latter has swung down to sheet stopping position.

14. A machine for forming readily handleable batches of stiff sheets, each batch being of a predetermined height, said machine including a cutter for subdividing and advancing web into successive sheets, a conveyor for delivering said sheets from said cutter and at a lower rate than the speed of advancement of the sheet to the cutter, and in overlapped position, a table receiving the sheets from said cutter, a conveyor for delivering successive accumulated batches of sheets along said table, means for starting said conveyor when a predetermined number of sheets have been accumulated on said table, a stop above said table in the path of movement of said sheets, and pivotally supported at its upper end, a pusher movable over said table to push a batch along said table and thereby swing said stop out of the path of movement of said batch, a sheet counter, means controlled thereby for starting said pusher and stopping said conveyor when a predetermined number of sheets have been delivered onto said table, and means for stopping said conveyor when a batch of sheets have been pushed beyond said stop and said pusher is beneath said table.

ARTHUR F. SPERLING.
WILLIAM E. SCHROEDER.

References Cited in the file of this patent
UNITED STATES PATENTS

| Number | Name | Date |
|---|---|---|
| 204,097 | Sawyer | May 21, 1878 |
| 1,266,738 | Wood | May 21, 1918 |
| 1,569,032 | Reichel | Jan. 12, 1926 |
| 2,233,490 | Shields | Mar. 4, 1941 |
| 2,424,093 | Harred | July 15, 1947 |
| 2,506,550 | Morrison | May 2, 1950 |